US008997914B2

(12) United States Patent
Umemoto et al.

(10) Patent No.: US 8,997,914 B2
(45) Date of Patent: Apr. 7, 2015

(54) WORK VEHICLE

(75) Inventors: Hideya Umemoto, Sakai (JP); Akira Minoura, Osaka (JP)

(73) Assignee: Kubota Corporation, Osaka (JP)

( * ) Notice: Subject to any disclaimer, the term of this patent is extended or adjusted under 35 U.S.C. 154(b) by 191 days.

(21) Appl. No.: 13/562,566

(22) Filed: Jul. 31, 2012

(65) Prior Publication Data

US 2013/0125703 A1     May 23, 2013

(30) Foreign Application Priority Data

Nov. 17, 2011   (JP) ................................ 2011-251878

(51) Int. Cl.
| | |
|---|---|
| *B60K 7/00* | (2006.01) |
| *B60K 17/28* | (2006.01) |
| *A01D 69/03* | (2006.01) |
| *A01D 69/06* | (2006.01) |
| *A01D 69/12* | (2006.01) |
| *F16H 57/04* | (2010.01) |

(52) U.S. Cl.
CPC ................ *B60K 17/28* (2013.01); *A01D 69/03* (2013.01); *A01D 69/06* (2013.01); *A01D 69/12* (2013.01); *F16H 57/0404* (2013.01); *F16H 57/0441* (2013.01); *F16H 57/0445* (2013.01); *B60Y 2200/223* (2013.01)
USPC ........... 180/308; 180/307; 180/6.48; 180/367

(58) Field of Classification Search
CPC ............ F16H 57/0445; F16H 57/0404; F16H 57/0441; F16H 63/065; F16H 37/084; B60W 10/101; B60W 10/103; B60W 10/107; B60K 6/543; B60K 17/00; B60K 17/06; B60K 17/34; B60K 17/3467; B60K 17/348; B60K 17/043; B60K 17/22; B60K 17/24
USPC ........ 180/305, 306, 248, 373, 307, 308, 6.48, 180/367; 475/182, 189, 190, 196, 197; 177/37, 38, 44, 50; 74/607, 606 R, 74/606 A
See application file for complete search history.

(56) References Cited

U.S. PATENT DOCUMENTS

| | | | | |
|---|---|---|---|---|
| 4,977,760 | A * | 12/1990 | Ishimori et al. ................. | 60/444 |
| 5,078,222 | A * | 1/1992 | Hauser et al. ................ | 180/6.48 |
| 5,564,518 | A * | 10/1996 | Ishii et al. ..................... | 180/242 |
| 6,174,260 | B1 * | 1/2001 | Tsukada et al. ................. | 476/50 |
| 6,543,548 | B1 * | 4/2003 | Ichikawa et al. ................ | 172/49 |
| 6,725,954 | B1 * | 4/2004 | Keane et al. ................. | 180/6.48 |
| 6,758,290 | B2 * | 7/2004 | Jolliff et al. .................. | 180/6.48 |
| 6,758,301 | B2 * | 7/2004 | Shiba et al. .................... | 180/383 |

(Continued)

FOREIGN PATENT DOCUMENTS

| | | | |
|---|---|---|---|
| JP | H 112-78089 | * | 10/1999 |
| JP | 2004-114751 | * | 4/2004 |

(Continued)

*Primary Examiner* — J. Allen Shriver, II
*Assistant Examiner* — Emma K Frick
(74) *Attorney, Agent, or Firm* — Greenblum & Bernstein, P.L.C.

(57) ABSTRACT

A pump supplying reservoir oil reservoired in an input case to devices to be supplied with the reservoir oil and a filter for filtering the reservoir oil circulating in the input case are provided in the input case. A pump supplying reservoir oil in each of left and right axle cases to a hydraulic continuously variable transmission provided in each of the axle cases and a filter filtering the reservoir oil circulating in each of the left and right axle cases are provided in each of the left and right axle cases.

20 Claims, 10 Drawing Sheets

(56) References Cited

U.S. PATENT DOCUMENTS

| | | | |
|---|---|---|---|
| 6,820,403 B2 * | 11/2004 | Umemoto | 56/10.8 |
| 6,886,646 B2 * | 5/2005 | Sugimoto et al. | 180/6.48 |
| 7,040,445 B2 * | 5/2006 | Ishii et al. | 180/307 |
| 7,303,503 B2 * | 12/2007 | Imanishi et al. | 476/10 |
| 7,370,714 B2 * | 5/2008 | Yasuda et al. | 180/53.4 |
| 7,401,589 B2 * | 7/2008 | Oishi et al. | 123/196 R |
| 7,407,030 B2 | 8/2008 | Yasuda et al. | |
| 7,419,025 B2 * | 9/2008 | Ishii et al. | 180/242 |
| 7,455,132 B2 * | 11/2008 | Acharya et al. | 180/53.4 |
| 7,588,103 B2 * | 9/2009 | Iwaki et al. | 180/6.32 |
| 7,621,353 B2 * | 11/2009 | Ishii et al. | 180/6.2 |
| 7,658,257 B2 * | 2/2010 | Sakikawa et al. | 180/308 |
| 7,673,712 B2 * | 3/2010 | Iida et al. | 180/53.1 |
| 7,690,470 B2 * | 4/2010 | Iwaki et al. | 180/252 |
| 7,798,259 B2 * | 9/2010 | Iida et al. | 180/6.2 |
| 7,900,737 B2 * | 3/2011 | Isogai | 180/305 |
| 7,971,675 B2 * | 7/2011 | Ishii et al. | 180/242 |
| 7,980,351 B2 * | 7/2011 | Iwaki et al. | 180/305 |
| 8,151,927 B2 * | 4/2012 | Sakikawa | 180/308 |
| 8,297,386 B2 * | 10/2012 | Osuga et al. | 180/53.6 |
| 2005/0217919 A1 * | 10/2005 | Okada et al. | 180/305 |
| 2006/0278459 A1 * | 12/2006 | Iwaki et al. | 180/242 |
| 2007/0012503 A1 * | 1/2007 | Iida | 180/305 |
| 2007/0066434 A1 | 3/2007 | Iida et al. | |
| 2009/0120709 A1 * | 5/2009 | Iida | 180/307 |
| 2014/0051546 A1 * | 2/2014 | Maruyama et al. | 477/5 |

FOREIGN PATENT DOCUMENTS

| | | |
|---|---|---|
| JP | 2006-64012 | 8/2004 |
| JP | 2007-196861 | 1/2006 |
| JP | 2007106138 | 4/2007 |

* cited by examiner

WORK VEHICLE

CROSS-REFERENCE TO RELATED APPLICATIONS

The present application claims priority under 35 U.S.C. §119 of Japanese Application No. 2011-251878, filed on Nov. 17, 2011, the disclosure of which is expressly incorporated by reference herein in its entirety.

BACKGROUND OF THE INVENTION

1. Field of the Invention

The present invention relates to a work vehicle in which, on left and right sides of an input case, axle cases are respectively positioned to drive left and right wheels, the input case forming an enclosed space into which an input shaft for engine power transmission is introduced, the axle cases forming enclosed spaces (separate from the previous enclosed space) in which hydraulic continuously variable transmissions are respectively internally installed and supporting axles of left and right traveling wheels, and the left and right wheels being driven via the hydraulic continuously variable transmissions.

2. Description of Related Art

As a work vehicle provided with an input case and axle cases as described above, technologies described in the following [1] and [2] are known.

[1] A work vehicle is known having a configuration in which a base housing into which an input shaft for engine power transmission is introduced and a pump case in which a hydraulic pump body of a hydraulic continuously variable transmission is internally installed are provided, a driving force of the input shaft is transmitted via a first and a second pump shafts to the hydraulic pump body, and a driving wheel is driven via a hydraulic motor body that is fluid-connected to the hydraulic pump body (for example, see Related Art 1).

[2] A work vehicle is known having a configuration in which an input case into which an input shaft for engine power transmission is introduced and an axle case in which a hydraulic continuously variable transmission is internally installed are provided, a driving force of the input shaft is transmitted via a traveling counter shaft to the hydraulic continuously variable transmission, and a rear wheel supported on the axle case is driven by the driving force of the hydraulic continuously variable transmission (for example, see Related Art 2).

[Related Art 1] Japanese Patent Laid-Open Publication No. 2006-64012 (see paragraphs [0021] and [0024], and FIGS. 1, 2, 3 and 7).

[Related Art 2] Japanese Patent Laid-Open Publication No. 2007-196861 (see paragraphs [0024], [0034], [0038], [0042] and [0046], and FIGS. 5, 6 and 8).

In the work vehicle having the conventional structure described in the above [1], the pump case in which the hydraulic pump body of the hydraulic continuously variable transmission is internally installed and the motor unit in which the hydraulic motor body is internally installed are configured using separate cases and are separately supported on a vehicle frame, and the driving wheels are also supported on respective vehicle frame side. Therefore, as a whole, there is a tendency of becoming large in size. Further, the base housing into which the input shaft is introduced, the pump case in which the hydraulic pump body is internally installed, and the motor unit in which the hydraulic motor body is internally installed are configured with separate cases. Therefore, spaces inside these cases are communicatingly connected via a hydraulic circuit by external piping and the like connecting the spaces to each other. Therefore, as the sealing capability required for each of the cases, the sealing capability in common with the case that requires the highest sealing accuracy is required for all the cases. Further, hydraulic oil that passes through the hydraulic continuously variable transmission and lubrication oil that passes through a gear mechanism in the base housing are reservoired in a common reservoir space in the base housing. Therefore, there is a possibility that metal abrasion powder and the like that exist in the reservoir space are sucked in by a fuel pump.

In the work vehicle having the conventional structure described in the above [2], the rear wheels are supported by the respective axle case. Therefore, by supporting the rear wheels by the respective axle case in which the hydraulic continuously variable transmission is internally installed, it is useful in that structural simplification and downsizing can be achieved. However, even in this conventional structure, although the input case into which the input shaft is introduced and the axle case in which the hydraulic continuously variable transmission is internally installed are provided, the space inside the input case into which the input shaft is introduced and the space in which the hydraulic continuously variable transmission is arranged are communicatingly connected by a hydraulic circuit by external piping and the like connecting the spaces to each other. For this reason, sealing capabilities that are set in various ways for each of the cases when a separate oil passage is provided for each of the cases have become common for all oil passages of the cases. Therefore, it becomes necessary to apply the sealing capability in common with the case that requires the highest sealing accuracy to all the cases, and thus, there is room for improvement in this respect. Further, hydraulic oil that passes through the hydraulic continuously variable transmission and lubrication oil that passes through a gear mechanism in the input case are reservoired in a common reservoir space at the bottom of the input case. Therefore, there is a possibility that foreign substances such as metal abrasion powder and the like that exist in the reservoir space are sucked in by a fuel pump. When the shape of the input case is devised to avoid this, the shape of the input case may become complicated, which may lead to circumstances such that maintenance work and the like may become cumbersome.

SUMMARY OF THE INVENTION

A purpose of the present invention is to achieve structural simplification and downsizing by supporting an axle on an axle case in which a hydraulic continuously variable transmission is internally installed, and to achieve optimization of a sealing structure by avoiding supplying reservoir oil containing foreign substances such as metal abrasion powder and the like that are likely to be generated in a certain case portion to a device in another case for which avoiding contact with the reservoir oil containing the foreign substances is preferred, while avoiding early deterioration of a device due to abrasion, complication of the shape of a case, and making maintenance work cumbersome.

In a configuration of an aspect of the present invention for achieving the above purpose, on left and right sides of an input case, axle cases are respectively positioned to drive left or right wheels, the input case forming an enclosed space into which an input shaft for engine power transmission is introduced, the axle cases forming enclosed spaces (separate from the previous enclosed space) in which hydraulic continuously variable transmissions are respectively internally installed and supporting axles of left or right traveling wheels, and the left or right wheels being driven via the hydraulic continuously variable transmissions. A branch transmission shaft branch-transmitting a driving force of the input shaft to the hydraulic continuously variable transmissions in the axle cases is provided in the input case. A fuel pump supplying reservoir oil reservoired in the input case to devices to be supplied with the reservoir oil and a filter for filtering the reservoir oil circulating in the input case are provided in the input case. A fuel pump supplying reservoir oil in each of the left or right axle cases to the hydraulic continuously variable transmission provided in each of the left and right axle cases and a filter filtering the reservoir oil circulating in each of the axle cases are provided in each of the axle cases.

According to the configuration of this aspect of the present invention, the axle cases supporting the axles of the left or right traveling wheels are used as cases in which the hydraulic continuously variable transmissions are internally installed, and the driving force is transmitted on the left and right sides of the input case. Therefore, as compared to the structure in which a case in which a hydraulic continuously variable transmission is internally installed and an axle case supporting an axle are separately configured and are separately supported on a vehicle body frame, structural simplification and compactness can be achieved. Further, the input case and the axle cases on the left and right sides of the input case are respectively configured with structures having independent enclosed spaces and a fuel pump and a filter are provided for each of the cases. Therefore, mixing between the reservoir oils in different cases does not occur. For this reason, there is an advantage that reservoir oil in a case that is provided with a gear mechanism and the like and in which metal abrasion powder is likely generated can be prevented from being supplied to a device in a separate case that is susceptible to wearing such as a hydraulic continuously variable transmission, and thus, wearing of a device that is susceptible to wearing is prevented and durability is thus improved. Further, each of the cases has a separate enclosed space and is separately provided with a fuel pump and a filter, forming a separate oil passage. Therefore, there is an advantage that a structure can be selected for an adequate sealing performance by respectively setting a suitable sealing accuracy and the like for each of the cases.

In an configuration of another aspect of the present invention for achieving the above purpose, the input case and the axle cases on the left and right sides have fitting portions formed on mutually opposing sides in a lateral direction and at places on outer periphery sides of the branch transmission shaft, the fitting portions being engageable and disengageable depending on a relative movement between the input case and the axle cases along an axial direction of the branch transmission shaft. In an engaged state of the fitting portions, the input case and the axle cases are linked in a state in which relative movements between the input case and the axle cases in vertical and longitudinal directions are regulated.

The input case and the axle cases on the left and right sides are provided with fitting portions on sides opposing each other and are mutually engaged. Therefore, their positions in the vertical and longitudinal directions are regulated by the fitting places. That is, large loads are supported in the vertical and longitudinal directions at the fitting places of the cases. Therefore, there is an advantage that the structure connecting the cases to each other can be easily simplified.

In a configuration of another aspect of the present invention for achieving the above purpose, in the input case, a PTO shaft is supported for taking out a driving force from the input case to outside and a PTO clutch is internally installed for intermittently transmitting a driving force transmitted from the input shaft to the PTO shaft.

As described above, according to the configuration of this aspect of the present invention, the input case is also used as the case that houses the PTO shaft and the PTO clutch, and thus a compact configuration is possible.

In a configuration of another aspect of the present invention for achieving the above purpose, a lift arm lift-operating a working apparatus and a lifting cylinder for up and down swinging the lift arm are provided on a work vehicle body, and a lifting valve controlling actuation of the lifting cylinder is provided in the input case and reservoir oil in the input case is supplied.

According to the configuration of this aspect of the present invention, the lifting valve controlling the actuation of the lifting cylinder is provided in the input case and the reservoir oil in the input case is supplied. Therefore, there is an advantage that the structure of supplying and discharging the reservoir oil with respect to the lifting valve can be easily simplified.

As used in the instant application, unless otherwise specified, the term "fuel pump" means a pump that pumps reservoir oil, hydraulic oil or oil pumped within an input or axle cases.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, an example of an embodiment of the present invention is explained based on the description of the drawings.

[Overall Configuration of Work Vehicle]

Figure 1:
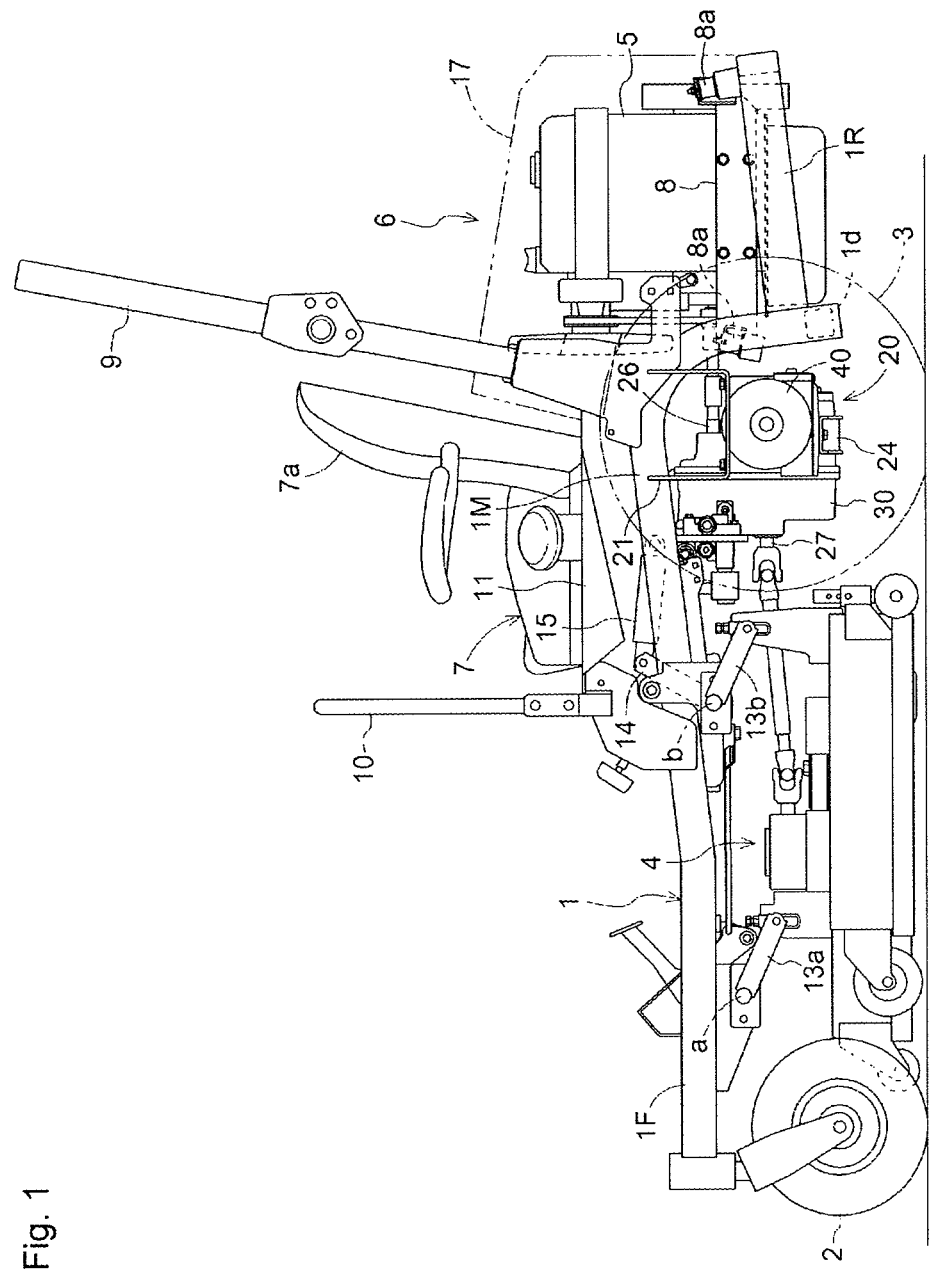
FIG. 1 is an entire side view of a riding type mower.
Figure 2:
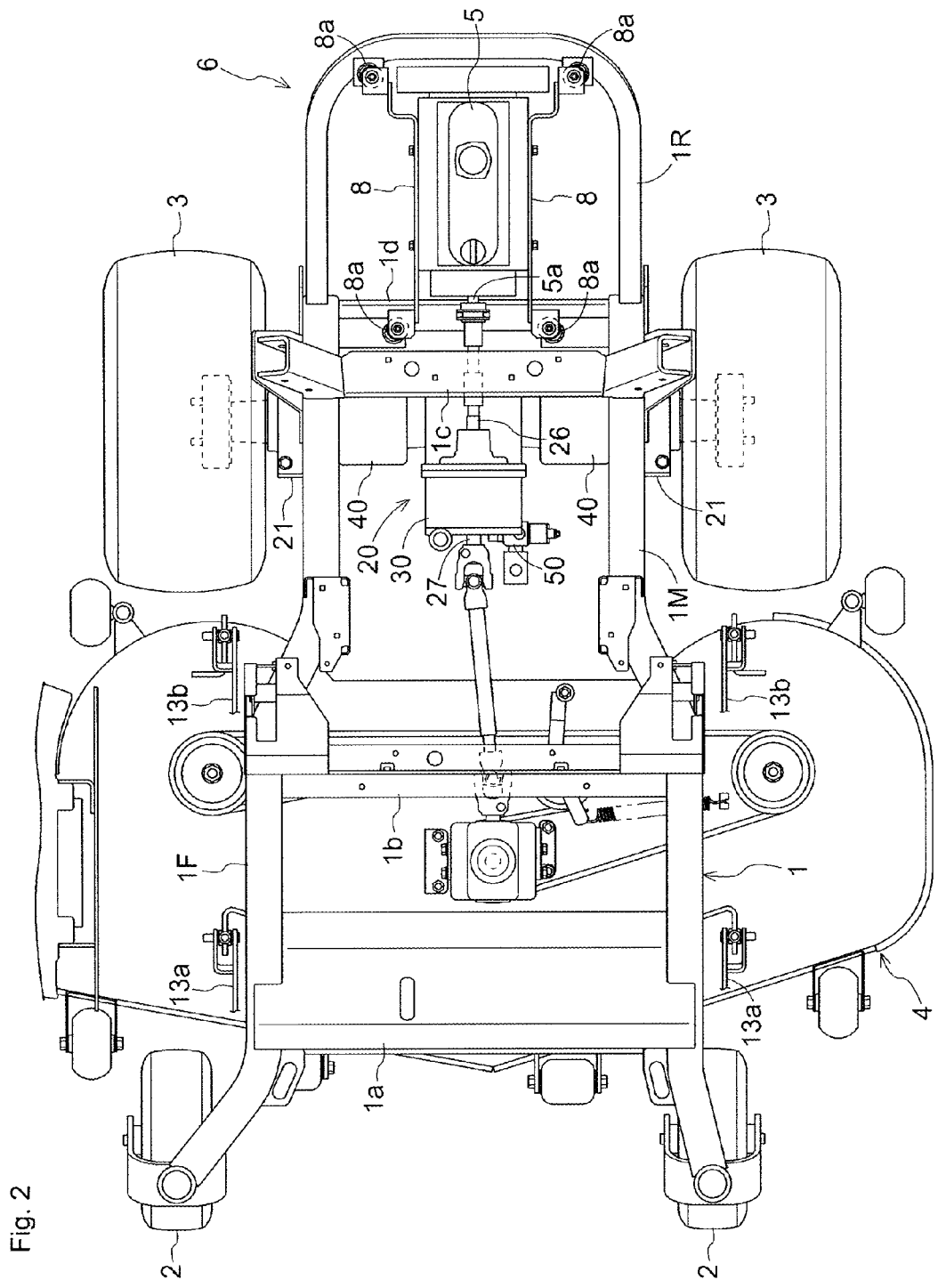
FIG. 2 is an entire plan view illustrating a body frame portion of the riding type mower.

FIG. 1 illustrates an entire side view of a riding type mower, which is an example of a work vehicle according to the present invention. FIG. 2 illustrates an entire plan view of a body frame portion of the riding type mower. The riding type mower is configured in a mid-mount type in which a pair of left and right front wheels 2 are provided at a front end portion of a body frame 1 and rear wheels 3 (corresponding to traveling wheels) are provided at a place closer to a rear end side of the body frame 1, and in addition, a bar blade type mower 4 (corresponding to a working apparatus) is vertically movably suspended and supported between the front and rear wheels. A prime mover unit 6 equipped with a water-cooled engine 5 is provided at a rear portion of the body frame 1 and a driver's seat 7 is provided at a middle portion in a longitudinal direction (front-back direction) of the vehicle body. Further, along a back rest 7a of the driver's seat 7 and at a rear position thereof, a gate-shaped ROPS (rollover protection structure) 9 is erected in a state in which a lower end side of the ROPS 9 is fixed to the body frame 1.

The pair of left and right front wheels 2 are configured with caster type idling wheels. The pair of left and right rear wheels 3 are configured as drive wheels that are left and right independent and are driven with variable speed changing and forward and reverse rotations and are configured in a manner that rotation directions and rotation speeds are controlled by using a pair of left and right operation control levers 10 provided at the front of the driver's seat 7. That is, by simultaneously swingably operating forward or backward the pair of left and right operation control levers 10 from neutral stop positions illustrated in FIG. 1 to drive forward or backward the left and right rear wheels 3 together with equal speeds, forward or backward straight traveling can be performed. By separately swingably operating the left and right operation control levers 10 in the longitudinal direction to provide a speed difference to the left and right rear wheels 3, turning toward any direction can be performed.

Figure 3:
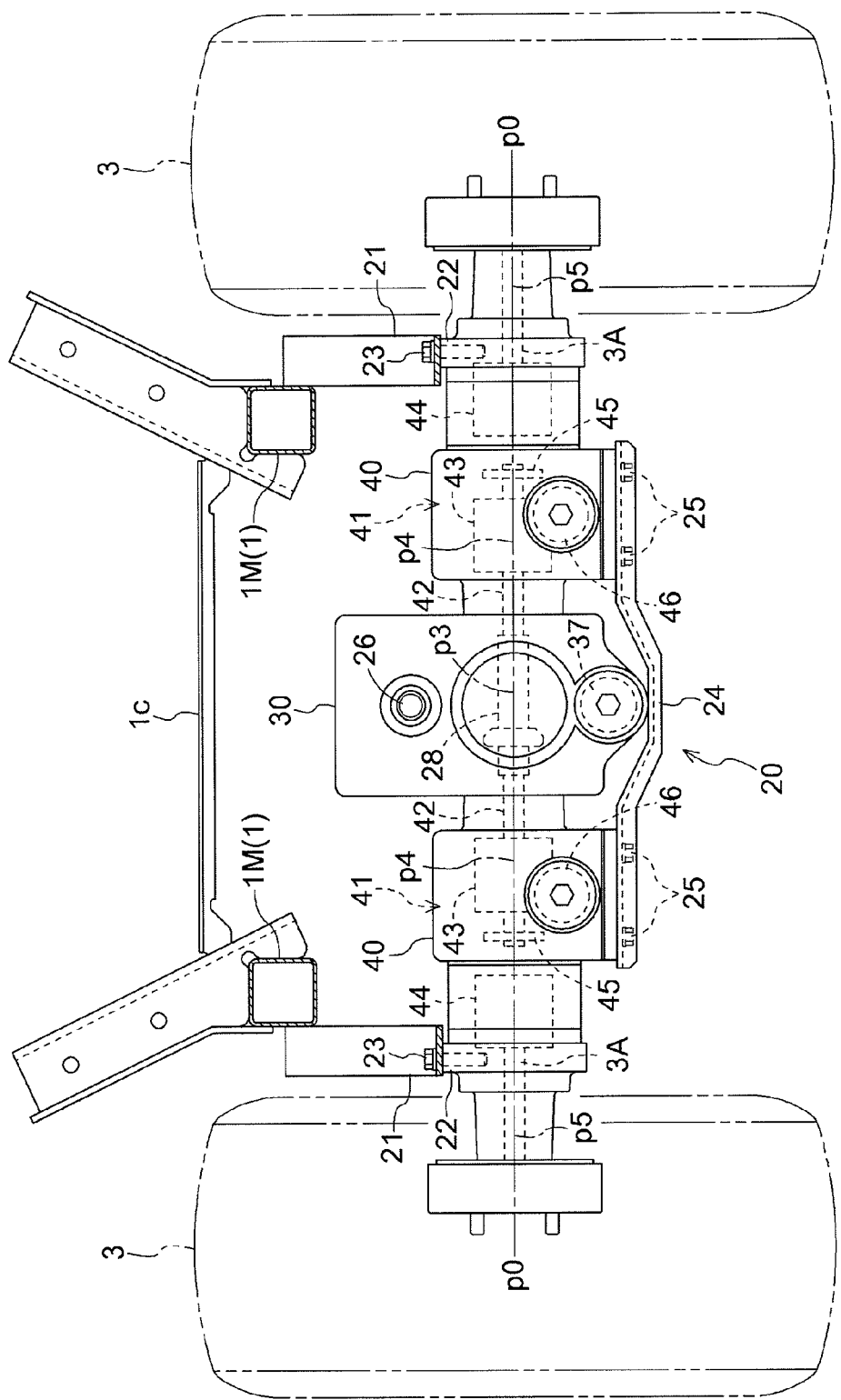
FIG. 3 is a rear view of a rear wheel drive unit.

As illustrated in FIG. 3, the body frame 1 is configured to include front side frame portions 1F spaced with a wide width in a lateral direction (left-right direction), middle frames 1M spaced with a width in the lateral direction that is narrower than that of the front side frame portions 1F, and a rear side frame portion 1R that is formed in a U-shape with an open front in a plan view and front end portions on the opening side thereof are connected to rear sides of the middle frames 1M.

Left and right front side frame portions 1F are connected with a first lateral bridge member 1a and a second lateral bridge member 1b at two places at front and rear portions. Above the first and second lateral bridge members 1a, 1b, operating unit steps (not shown in the drawings) are installed. The left and right front side frame portions 1F are formed with their rear end sides bent toward the center of the vehicle body in the lateral direction and are configured to be connected to the middle frame portions 1M that are formed at the rear sides spaced with a narrow width. That is, the front side frame portions 1F and the middle frame portions 1M are configured with a series of tubular frames of rectangular cross-sections. Middle portions in the longitudinal direction of the frames are bent, thereby configuring the front side frame portions 1F spaced with a wide width in the lateral direction and the middle frame portions 1M spaced with a width narrower than that of the front side frame portions 1F.

As illustrated in FIG. 3, the middle frame portions 1M, which are spaced with a narrow width and are connected to the rear sides of the front side frame portions 1F spaced with a wide width, are connected at places near their rear end portions by a third lateral bridge member 1c that is installed along the lateral direction. The connecting third lateral bridge member 1c is arranged in a manner overlapping, in a plan view, upper sides of rear portions of left and right axle cases 40. On the middle frame portions 1M, the driver's seat 7 is installed having a seat surface at a position higher than the operating unit steps that are installed on the upper side of the front side frame portions 1F and the middle frame portions 1M. On the left and right of the driver's seat 7, fenders 11 are provided.

Figure 4:
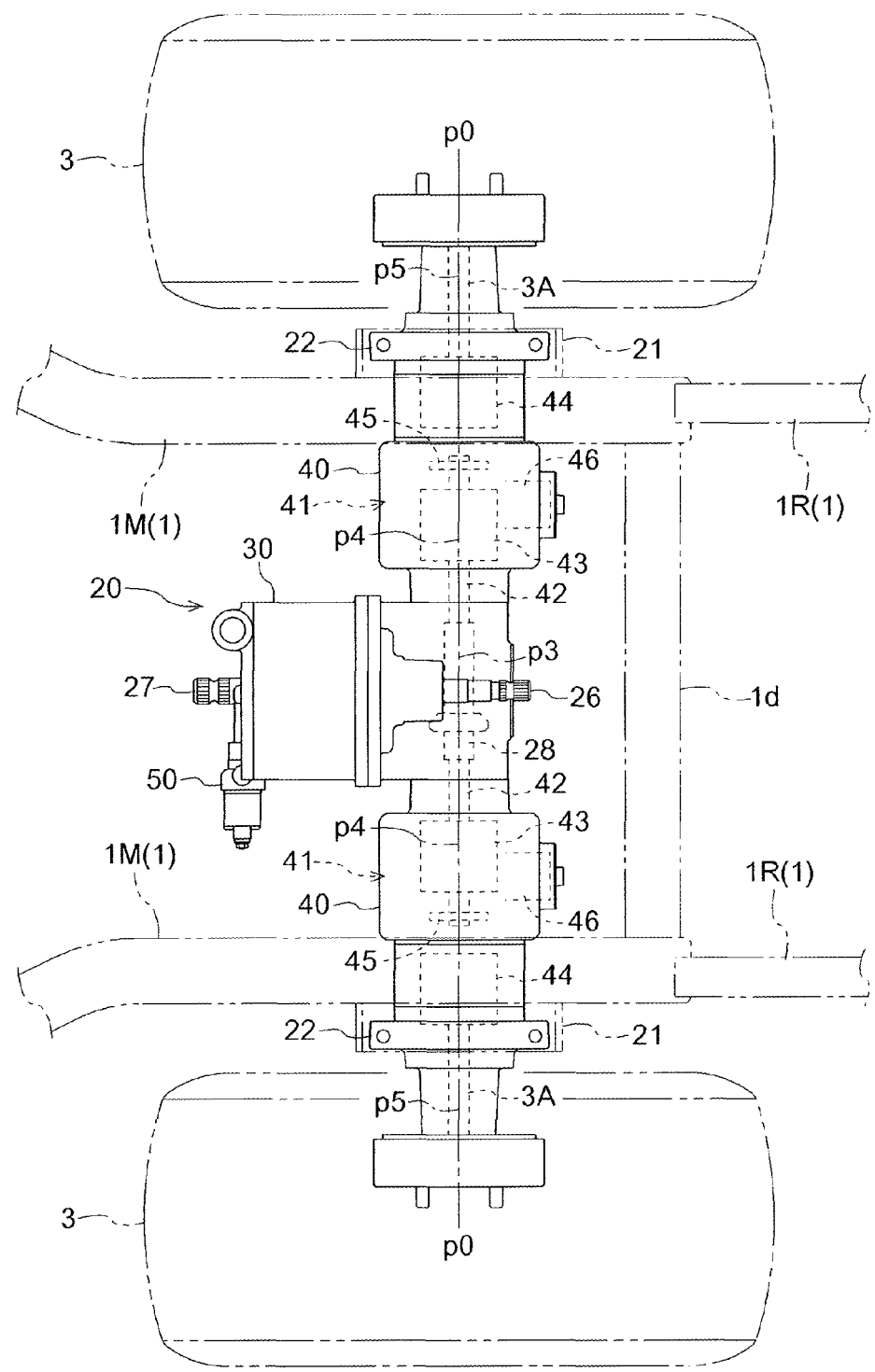
FIG. 4 is a plan view of the rear wheel drive unit.

As illustrated in FIGS. 1 and 4, the middle frame portions 1M are formed in such a manner that the rear sides of the rear end portions of the middle frame portions 1M are bent downward along outer periphery of the axle cases 40 that support the rear wheels 3. Lower end portions of the downward bending portions of the middle frame portions 1M are mutually connected and fixed by a fourth lateral bridge member 1d. Further, on the lower end portions of the downward bending portions of the middle frame portions 1M, the rear side frame portion 1R that is formed in a U-shape in a plan view is provided in a manner being connected to the rear side of the middle frame portions 1M, extending toward rear side and connecting the left and right middle frame portions 1M. On the rear side frame portion 1R, the engine 5 is mounted via a holding member 8, which is provided with anti-vibration rubbers 8a arranged at two places on a front side and two places on a rear side of the holding member 8. The engine 5 is a water-cooled diesel engine and is arranged in a manner that an axis of an output shaft 5a of the engine 5 is oriented toward the front. Lateral sides, outer periphery of a rear side and a top of the engine 5 are covered by a hood 17.

A front link 13a and a rear link 13b are respectively connected to front and rear portions of each of the front side frame portions 1F in a manner up-and-down swingable about fulcrum points a and b. Over the free ends of these front links 13a and rear links 13b, the mower 4 is suspended and supported in a parallel four-link shape. The rear link 13b is linked to a single-acting type hydraulic cylinder 15 via a lift arm 14. The hydraulic cylinder 15 performs extension actuation when hydraulic oil is supplied, and thereby the links 13a, 13b are swingably driven upward and the mower 4 is raised in a parallel manner. The hydraulic cylinder 15 performs contraction actuation when hydraulic oil is discharged, and thereby the mower 4 is lowered by its own weight in a parallel manner.

[Structure of Rear Wheel Drive Unit]

As illustrated in FIGS. 1-5, at a rear portion of the middle frame portions 1M, a rear wheel drive unit 20 is connected and supported. As illustrated in FIGS. 1-5, the rear wheel drive unit 20 is configured to include a central input case 30 into which output from the engine 5 is introduced, and a pair of axle cases 40 connected to left and right sides of the input case 30.

The rear wheel drive unit 20 is supported on the body frame 1 via mounting brackets 21, which are provided at rear portions of the middle frame portions 1M and are formed in a channel shape opened upward in a side view. That is, as illustrated in FIGS. 1-4, mounting seats 22 of the left and right axle cases 40 are provided at places facing lower sides of bottoms of the mounting brackets 21 at more outer sides than lateral outer edges of the middle frame portions 1M. The mounting seats 22 are capable of being bolt-connected to the mounting brackets 21 at two front and rear places. Therefore, by attaching (or detaching) connecting bolts 23 to (or from) the mounting seats 22, the mounting seats 22 can be attached to (or detached from) the mounting brackets 21, and the left and right axle cases 40 can be attached (or detached). This allows switching between a state in which the whole rear wheel drive unit 20 is fixedly attached to the body frame 1 and a state in which the whole rear wheel drive unit 20 is detached from the body frame 1.

As illustrated in FIG. 3, the left and right axle cases 40 of the rear wheel drive unit 20 are connected by a sub-frame 24 extending in the lateral direction on lower end sides of the left and right axle cases 40. The sub-frame 24 and each of the axle cases 40 are detachably connected by laterally elongated holes (not illustrated in the drawings) formed on the sub-frame 24 for adjusting connecting positions and connecting bolts 25 screwed to the axle cases 40 through the elongated holes. The central input case 30, in a state of being not connected to the sub-frame 24, is detachably connected and fixed to a proper place (not illustrated in the drawings) on the middle frame portions 1M.

[Input Case]

Figure 5:
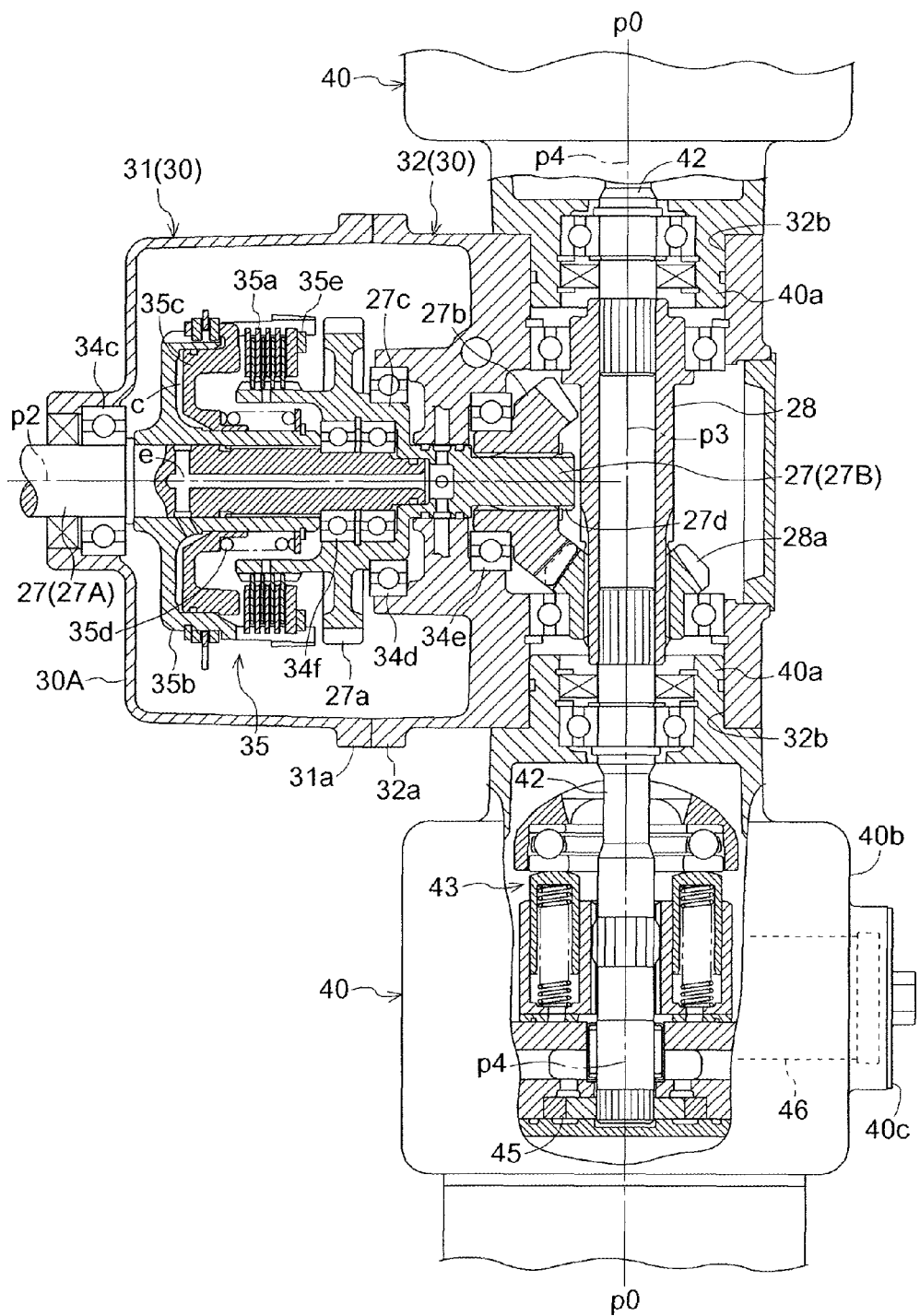
FIG. 5 is a horizontal cross-sectional view of the rear wheel drive unit.
Figure 6:
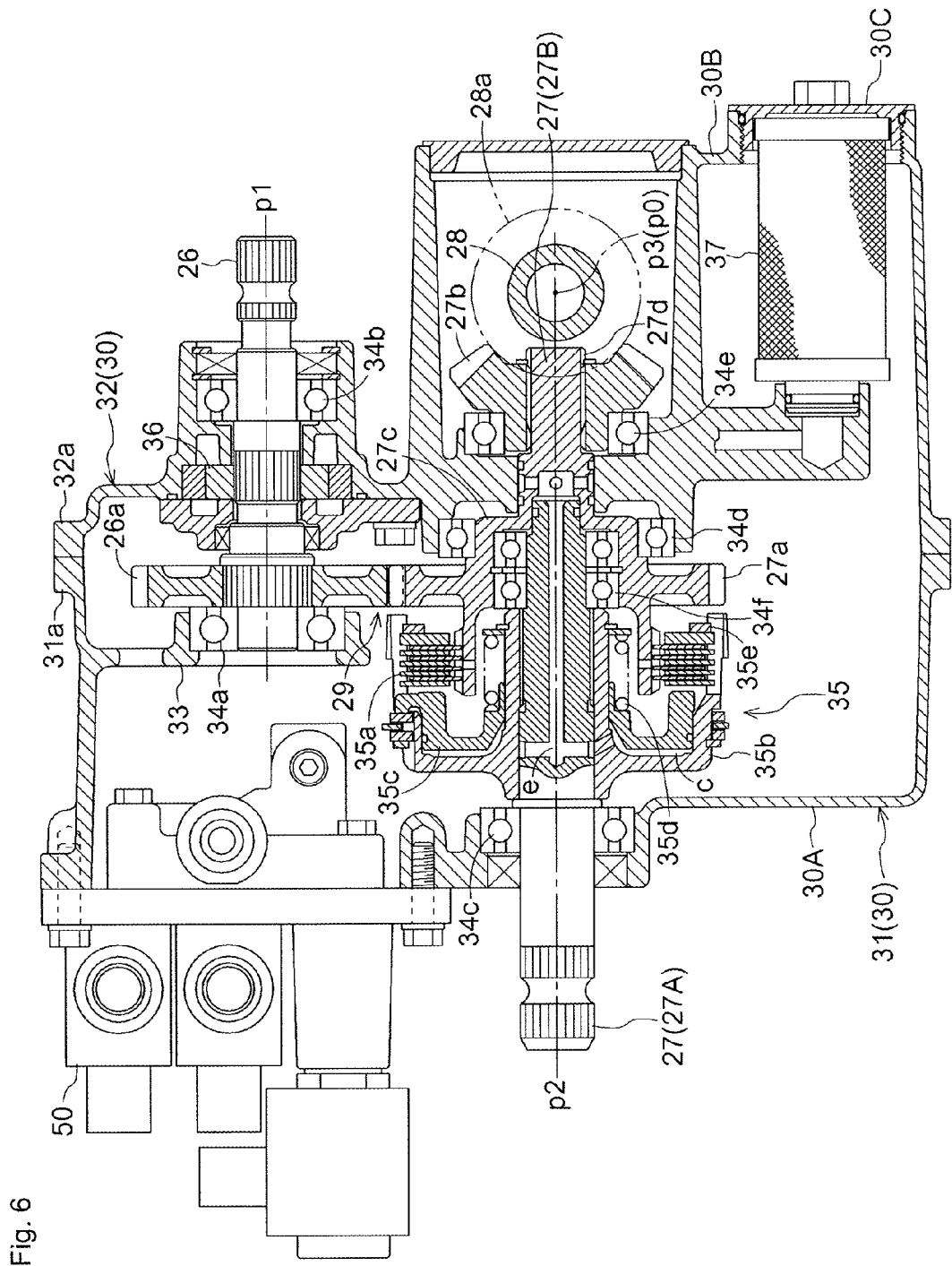
FIG. 6 is a vertical cross-sectional view of the rear wheel drive unit.

As illustrated in FIGS. 4-6, the input case 30 is configured to include a front input case 31 and a rear input case 32. The front input case 31 supports a PTO shaft 27 in a state protruding toward the front side, an axis p2 of the PTO shaft 27 being oriented in the longitudinal direction. An input shaft 26 linked to the output shaft 5a of the engine 5 on a rear side protrudes rearward from an upper portion of a rear side of the rear input case 32, an axis p1 of the input shaft 26 being oriented in the longitudinal direction. The front input case 31 and the rear input case 32 are detachably connected through connecting bolts (not illustrated in the drawings) by joining flanges 31a, 32a that are respectively formed on a rear end side of the front input case 31 and a front end side of the rear input case 32.

Fitting portions 32b for the left and right axle cases 40 are respectively provided on the left and right in the rear input case 32 of the input case 30. The left and right axle cases 40 are connected to the input case 30 in a state in which the left and right fitting portions 32b of the rear input case 32 are fitted to fitting portions 40a that are formed on inner end sides of the left and right axle cases 40. In the above described configuration, in the state in which the left and right fitting portions 32b of the rear input case 32 and the fitting portions 40a of the left and right axle cases 40 are fitted and connected, the power output from the input case 30 side is branch-transmitted into the left and right axle cases 40 via a branch transmission shaft 28 as will be described later. An axis p3 of the branch transmission shaft 28 (which will be described later), an axis p4 of an input shaft 42 of a hydraulic continuously variable transmission 41, and an axis p5 of an axle 3A are arranged in a manner that they are positioned on the same one straight line p0 in a direction perpendicular to the axis p1 of the input shaft 26 and the axis p2 of the PTO shaft 27.

The input shaft 26 has its front end portion bearing-supported by a bearing portion 34a composed of a ball bearing on a middle wall 33 portion in the front input case 31, and has its middle portion on a more rear side than the front end portion supported by a bearing portion 34b composed of a ball bearing provided in the rear input case 32. Further, a portion of the input shaft 26 on a more rear side than the supporting place protrudes to the outside. The driving force from the output shaft 5a of the engine 5 is transmitted to an end portion of the portion of the input shaft 26 that protrudes to the outside via a suitable adjustable joint (not illustrated in the drawings) and the like. The power transmitted to the input shaft 26 is transmitted to the PTO shaft 27 via a reduction gear mechanism 29 that is configured with an input gear 26a and a transmission gear 27a. The input gear 26a is composed of a flat gear that is positioned in the front input case 31 near the front end of the input shaft 26 and is provided to integrally rotate with the input shaft 26. The transmission gear 27a is composed of a large-diameter flat gear engaging with the input gear 26a.

As illustrated in FIGS. 5 and 6, the PTO shaft 27 is configured to include a PTO shaft front portion 27A and a PTO shaft rear portion 27B. The PTO shaft front portion 27A protrudes forward beyond a bearing portion 34c, which is positioned at a front portion of the front input case 31 and is composed of a ball bearing provided on a front wall 30A portion of the input case 30. The PTO shaft rear portion 27B has a branching bevel gear 27b provided at a rear end portion thereof transmitting the driving force to the branch transmission shaft 28 at the rear side. The PTO shaft front portion 27A and the PTO shaft rear portion 27B are configured to be operable to switch between a clutch engaged state in which the PTO shaft front portion 27A and the PTO shaft rear portion 27B integrally rotate and a clutch disengaged state in which the PTO shaft front portion 27A and the PTO shaft rear portion 27B are relatively rotatable, via a PTO clutch 35 interposed between the PTO shaft front portion 27A and the PTO shaft rear portion 27B.

The PTO shaft rear portion 27B is provided with the large-diameter transmission gear 27a on an outer periphery side engaging with the input gear 26a provided on the input shaft 26, and is provided with a cylindrical boss portion 27c for providing rotational power to friction plates 35a of the PTO clutch 35 at a more front side than the transmission gear 27a. The PTO shaft rear portion 27B is so configured as to spline-fit the branching bevel gear 27b to a spline portion 27d formed on the rear end portion to transmit the power received by the transmission gear 27a to the branch transmission shaft 28. The PTO shaft rear portion 27B is pivotally supported on the rear input case 32 via a bearing portion 34e and a bearing portion 34d. The bearing portion 34e is composed of a ball bearing that pivotally supports the outer periphery of a boss portion of the branching bevel gear 27b. The bearing portion 34d is composed of a ball bearing that pivotally supports the outer periphery side of the cylindrical boss portion 27c of the transmission gear 27a.

The PTO shaft front portion 27A has its front end side supported via the bearing portion 34c that is composed of the ball bearing provided on the front wall 30A portion of the front input case 31, and has its rear end side supported via a ball bearing 34f provided on an inner periphery side of the cylindrical boss portion 27c of the transmission gear 27a. In this configuration, the PTO shaft front portion 27A and the PTO shaft rear portion 27B integrally rotate with each other in the clutch engaged state of the PTO clutch 35 and are relatively rotatable about the same axis p2 in the clutch disengaged state of the PTO clutch 35.

The PTO clutch 35 is composed of a hydraulic multi-plate clutch, and is configured to include the cylindrical boss portion 27c that integrally forms the transmission gear 27a of the PTO shaft rear portion 27B; a clutch drum portion 35b that is externally fitted and fixed to the PTO shaft front portion 27A; a plurality of friction plates 35a that are engaged with each of the cylindrical boss portion 27c and the clutch drum portion 35b and are alternately layered; a piston member 35c that is internally fitted and installed inside the clutch drum portion 35b; a return spring 35d that biases the piston member 35c so as to press the piston member 35c toward the front side (in a clutch disengagement direction); and the like.

An oil chamber c formed between the clutch drum portion 35b and the piston member 35c is communicatingly connected to a switching valve 54, which will be described later, via an oil passage e formed inside the PTO shaft front portion 27A. In this configuration, by supplying hydraulic oil to the oil chamber c, the piston member 35c is pushed out rearward against the return spring 35d so that the friction plates 35a are sandwiched and pressurized between the piston member 35c and a stopper 35e, thereby bringing about the "clutch engaged" state in which power transmission from the cylindrical boss portion 27c to the clutch drum portion 35b is performed. By letting out the pressure from the oil chamber c, the piston member 35c is moved backward by the return spring 35*d* so that the pressing force applied on the friction plates 35*a* is released, thereby bringing about the "clutch disengaged" state in which power transmission from the cylindrical boss portion 27*c* to the clutch drum portion 35*b* is blocked.

In the rear input case 32 of the input case 30, a hydraulic pump 36 (which corresponds to a fuel pump) is installed, which sucks in and pressurizes lubrication oil reservoired in the input case 30 and discharges the oil as high pressure hydraulic oil. The hydraulic pump 36 is configured by a trochoid type capacity pump (referred to as a trochoid pump in the following) that uses a well-known internal gear provided on outer periphery of the input shaft 26, and is configured in a manner capable of driving an inner rotor of the trochoid pump by using rotational power of the input shaft 26 and supplying and discharging the lubrication oil reservoired in the input case 30. As illustrated in the hydraulic circuit diagram of FIG. 7, this configuration allows the hydraulic oil discharged from the hydraulic pump 36 to be supplied via a control valve unit 50 to the hydraulic cylinder 15 for lifting the mower and to the PTO clutch 35.

Figure 7:
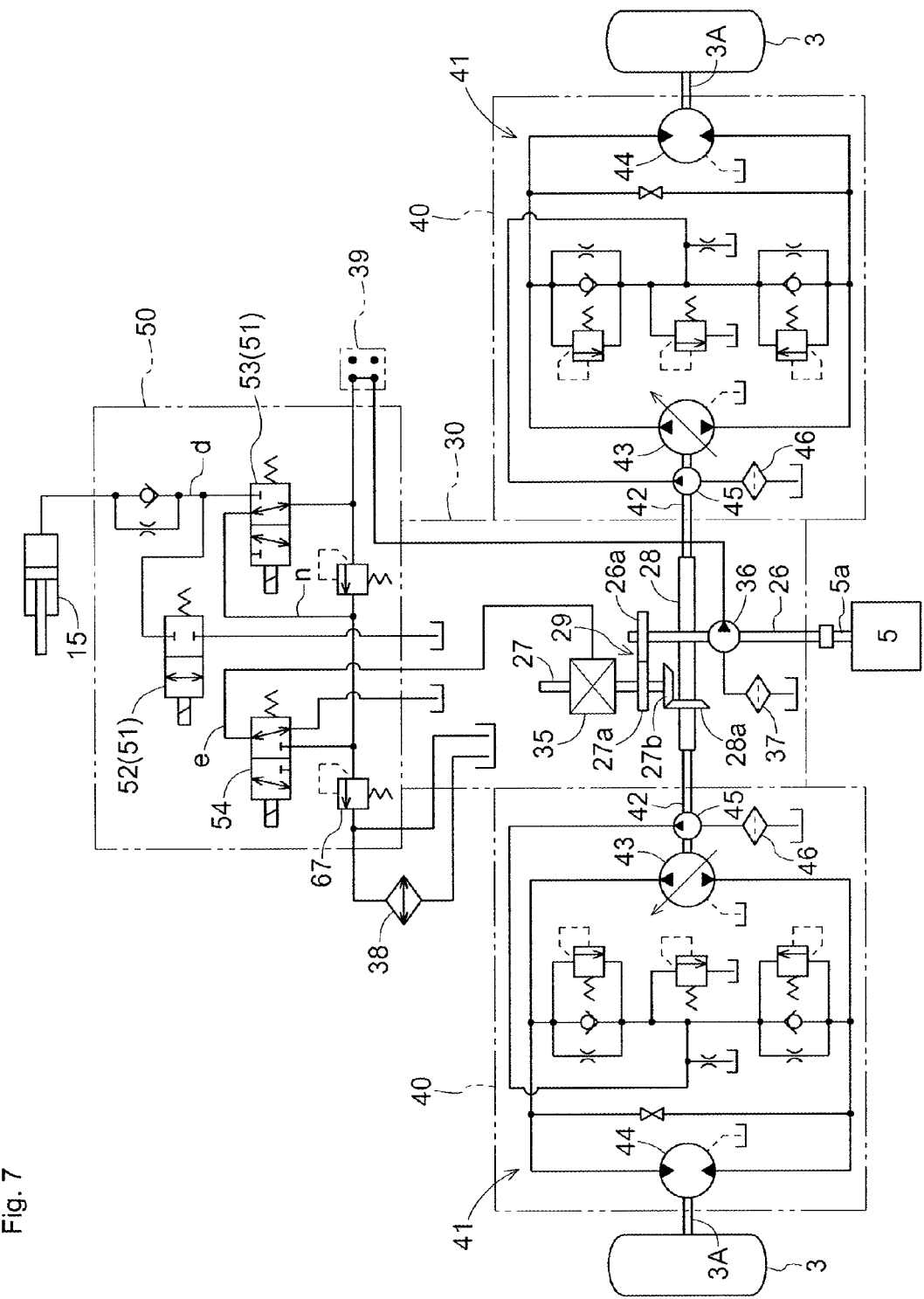
FIG. 7 is a hydraulic circuit diagram.

At the bottom of the rear input case 32 of the input case 30, an oil filter 37 is installed in a state in which a large portion of the oil filter 37 is inserted inside the rear input case 32. As illustrated in FIG. 6, the oil filter 37 is configured in a manner that an opening equipped with a screw type opening and closing lid 30C is provided on a rear wall 30B of the input case 30 that exists on the back of the rear input case 32, and a cartridge containing filtering material can be replaced from the outside by opening the opening and closing lid 30C. Therefore, the oil reservoired in the input case 30 passes through the filtering material in the cartridge and is purified, and, as illustrated in FIG. 7, is sucked in by the hydraulic pump 36 and is supplied through the control valve unit 50 to the hydraulic cylinder 15 for lifting the mower and to the PTO clutch 35. Thereafter, the oil is again returned to the input case 30 and is reservoired.

In this configuration, the reservoir oil in the input case 30 circulates inside the hydraulic system that uses the reservoir oil in the input case 30, without being supplied to a hydraulic system configured by an oil passage in the neighboring axle cases 40. An oil cooler 38 illustrated in FIG. 7 is for cooling the oil returning from the control valve unit 50 into the input case 30. A service port 39 illustrated in FIG. 7 is for enabling supply of hydraulic oil from the control valve unit 50 to another hydraulic equipment (not illustrated in the drawings) when such hydraulic equipment is connected to the control valve unit 50.

[Axle Case]

As illustrated in FIGS. 4 and 5, in each of the left and right axle cases 40 that are connected to the input case 30, a hydraulic continuously variable transmission 41 is internally installed. A branch transmission shaft 28 that is configured as a cylindrical shaft is connected across input shafts 42 of the left and right hydraulic continuously variable transmissions 41. An input bevel gear 28*a* that engages with the branching bevel gear 27*b* of the PTO shaft rear portion 27B is spline-fitted to the outer periphery of the branch transmission shaft 28. The input shafts 42 of the left and right hydraulic continuously variable transmissions 41 are spline-connected to the two end portions on the inner periphery side of the branch transmission shaft 28.

For the hydraulic continuously variable transmission 41, a pump motor of a well-known internal gear type gerotor structure is adopted. The axis p4 of the input shaft 42 of the hydraulic continuously variable transmission 41 and the axis p5 of the axle 3A supporting the rear wheels 3 are arranged to be positioned on the same straight line p0 in the axle cases 40. Further, the axis p3 of the branch transmission shaft 28 is also positioned on the same straight line p0. The input shaft 42 is linked to a stator of a pump 43 of a gerotor structure that is fixed on the axle case 40 in a manner to rotationally drive a rotor, and the axle 3A that also serves as an output shaft of a motor 44 of a gerotor structure is driven.

As illustrated in FIG. 5, in each of the left and right axle cases 40, a hydraulic pump 45 (which corresponds to a fuel pump) that sucks in and pressurizes reservoir oil reservoired in each of the axle cases 40 and discharges the reservoired oil as high pressure hydraulic oil is installed on the outer periphery of the input shaft 42 of the hydraulic continuously variable transmission 41 of each of the axle cases 40. The hydraulic pump 45 is configured by a trochoid pump that is similar to the trochoid type capacity pump that uses an internal gear provided on the outer periphery of the input shaft 26 of the input case 30, and is configured to drive an inner rotor of the trochoid pump by the rotational power of the input shaft 42 toward the hydraulic continuously variable transmission 41 and to circulate the hydraulic oil reservoired in the axle case 40. As illustrated in the hydraulic circuit diagram of FIG. 7, this configuration allows the hydraulic oil discharged from the hydraulic pump 45 to become refill oil for the hydraulic continuously variable transmission 41 in the axle case 40. As described above, the hydraulic pump 45 acts as a charge pump. In this configuration, surplus oil is returned to and reservoired in each of the axle cases 40.

As illustrated in FIGS. 4 and 5, an oil filter 46 is also installed near the bottom of each of the axle cases 40 in a state in which a large portion of the oil filter 46 is inserted inside each of the axle cases 40. This oil filter 46 also is configured in a manner that an opening equipped with a screw type opening and closing lid 40*c* is provided on an outer periphery wall 40*b* at the bottom on the rear side of the axle case 40, and a cartridge containing filtering material can be replaced from the outside by opening the opening and closing lid 40*c*. Therefore, as illustrated in FIG. 7, the oil reservoired in each of the axle cases 40 passes through the filtering material in the cartridge and is purified, and is sucked in by the hydraulic pump 45 and is supplied to a closed circuit of the hydraulic continuously variable transmission 41. Thereafter, surplus oil is again returned to the axle case 40 and is reservoired.

[Hydraulic Circuit]

As illustrated in FIG. 7, the oil reservoired in the input case 30 is sucked in by the hydraulic pump 36 and is supplied to the valve unit 50, the hydraulic pump 36 being driven by the input shaft 26 that transmits the driving force from the engine 5. The hydraulic oil supplied to the control valve unit 50 is branch-supplied to a circuit d and a circuit e, the circuit d supplying the hydraulic oil to the hydraulic cylinder 15 that operates the lift arm 14 for lifting the mower, and the circuit e supplying the hydraulic oil to the PTO clutch 35. In the circuit d supplying the hydraulic oil to the hydraulic cylinder 15 that operates the lift arm 14, a control valve 51 that governs the actuation of the hydraulic cylinder 15 is provided, and the hydraulic oil is supplied to the control valve 51 via an in-wall hydraulic circuit (not illustrated in the drawings) of the input case 30. In the circuit e that supplies the hydraulic oil to the PTO clutch 35, the switching valve 54 that controls the engagement and disengagement actuation of the PTO clutch 35 is incorporated. The circuit e that supplies the hydraulic oil to the PTO clutch 35 is connected to a return oil passage n from the control valve 51.

The control valve 51 is configured by a straight-line slide type spool valve on which a spool 51*s* is left-right slidably installed, and is linked via a link mechanism (not illustrated in the drawings) to a manual operation tool such as a lift operation lever 64 arranged in the vicinity of the driver's seat 7. The lift operation lever 64 is configured to forward-rearward swingably operable and is provided with a return biasing force toward a neutral position. When the lift operation lever 64 is operated to the front side, the spool 51s of the control valve 51 moves to a lowering position D, so that the hydraulic oil of the hydraulic cylinder 15 is discharged and the mower 4 is operated to a lowered side by its own weight. When the operation of the lift operation lever 64 is released, since the spool 51s of the control valve 51 is return-biased toward the neutral position, the spool 51s of the control valve 51 returns to the state before the operation, so that the spool 51s of the control valve 51 moves to a stop position S, and the mower 4 stops rising or lowering and remains in a state as when the spool 51s of the control valve 51 was at the lowering position D.

When the lift operation lever 64 is moved toward the rear side, the spool 51s of the control valve 51 moves to a rising position U, so that the hydraulic oil is supplied to the hydraulic cylinder 15 and the mower 4 is operated toward the rising side. When the operation of the lift operation lever 64 is released, since the spool 51s of the control valve 51 is return-biased toward the neutral position, the spool 51s of the control valve 51 returns to the state before the operation. Then, the spool 51s of the control valve 51 moves to the stop position S, and the mower 4 stops rising or lowering, remaining at the position as when the spool 51s of the control valve 51 was at the rising position U. The position at this height becomes a position of an arbitrary height of the mower 4.

In the circuit e that supplies the hydraulic oil to the PTO clutch 35, the switching valve 54 that controls the engagement and disengagement actuation of the PTO clutch 35 is provided. The switching valve 54 is configured as a rotary valve that rotationally operates a spool 54s and is configured to be capable of the engagement and disengagement operations by a manual operation using a PTO clutch lever 65 by linking the spool 54s and the PTO clutch lever 65 using a link mechanism (not illustrated in the drawings), the PTO clutch lever 65 being arranged on a lateral side of the driver's seat 7. As illustrated in the hydraulic circuit diagram of FIG. 7, in the return oil passage n from the control valve 51, a regulator 67 is connected, and a working pressure applied to the PTO clutch 35 is ensured. Drained oil discharged from the regulator 67 is cooled by the oil cooler 38 arranged within a radiator cooling air passage, and thereafter, is returned to the input case 30.

Therefore, as illustrated in FIGS. 5 and 7, when the switching valve 54 is operated to the clutch disengaged position, the pressure is let out from the oil chamber c, so that the piston member 35c is moved backward by the return spring 35d and the pressing force applied on the friction plates 35a is released, thereby bringing about the "clutch disengaged" state in which the power transmission from the cylindrical boss portion 27c to the clutch drum portion 35b is blocked. When the PTO clutch lever 65 is operated from the position illustrated in FIG. 7 to the left in FIG. 7 to move the spool 54s to the left, the switching valve 54 is operated to the clutch engaged position and the hydraulic oil is supplied to the oil chamber c, and thereby, the piston member 35c is pushed out rearward against the return spring 35d and the friction plates 35a are sandwiched and pressurized between the piston member 35c and the stopper 35e, thereby bringing about the "clutch engaged" state in which power transmission from the cylindrical boss portion 27c to the clutch drum portion 35b is performed.

First Alternative Embodiment

Figure 8:
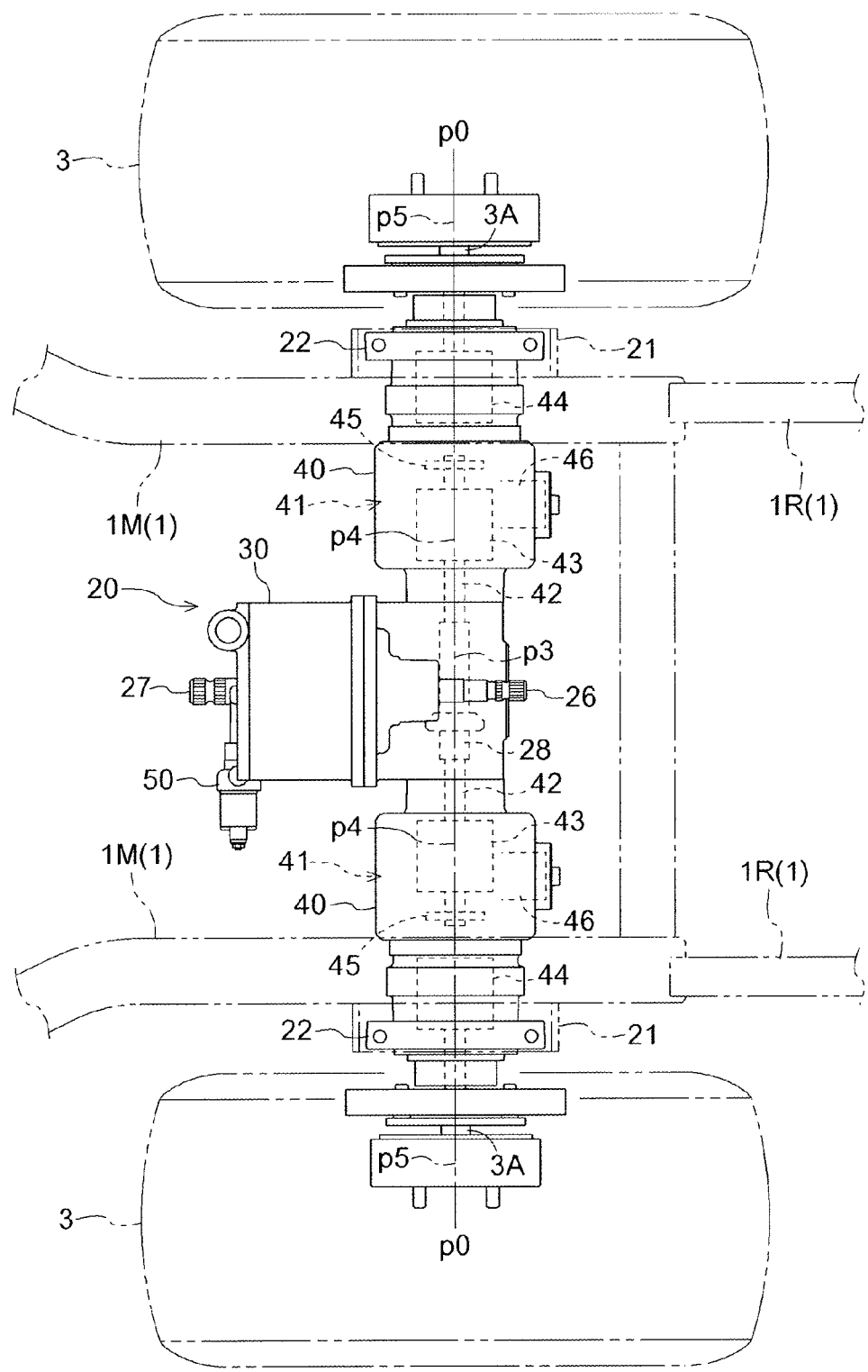
FIG. 8 is a plan view of a rear wheel drive unit in an alternative embodiment.

In the above-described embodiment, it is described that the hydraulic continuously variable transmission 41 provided in each of the axle cases 40 of the rear wheel drive unit 20 is configured by a pump motor of an internal gear type gerotor structure. However, the present invention is not limited to this. For example, as illustrated in FIG. 8, instead of having an internal gear type gerotor structure, the hydraulic continuously variable transmission 41 may also be configured using a pump 43 and a motor 44 arranged in a manner having a pump shaft and a motor shaft positioned on the same axis p4. In this case, it is desirable that the axis p4 of the pump 43 and the motor 44 be arranged in the axle case 40 on the same straight line p0 with respect to the axis p5 of the axle 3A and the axis p3 of the branch transmission shaft 28. Other configurations are configured the same way as in the above-described embodiment.

Second Alternative Embodiment

Figure 9:
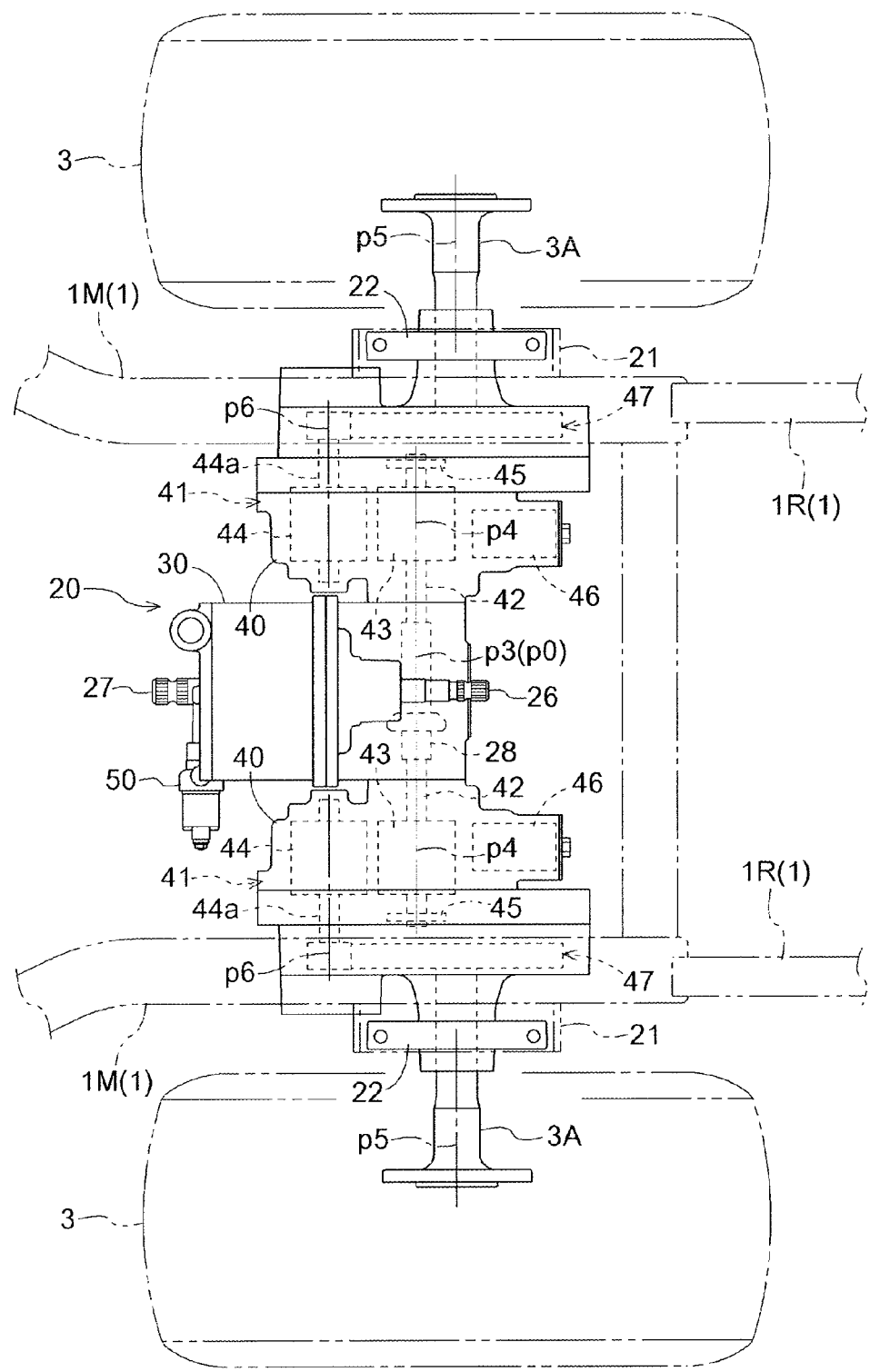
FIG. 9 is a plan view of a rear wheel drive unit in another alternative embodiment.

In the above-described embodiment, it is described that the hydraulic continuously variable transmission 41 provided in each of the axle cases 40 of the rear wheel drive unit 20 is configured by a pump motor of an internal gear type gerotor structure. However, the present invention is not limited to this. For example, as illustrated in FIG. 9, the hydraulic continuously variable transmission 41 may also be configured by a pump 43 and a motor 44, the pump 43 being provided with an input shaft 42 having an axis p4 positioned on the same straight line p0 as the axis p3 of the branch transmission shaft 28, and the motor 44 being provided with an output shaft 44a parallel to the input shaft 42 of the pump 43. The hydraulic continuously variable transmission 41 may be configured in such a manner that the driving force is transmitted from the output shaft 44a of the motor 44 via a second reduction gear mechanism 47 to the axle 3A. In this case, it is desirable that the output shaft 44a of the motor 44 be positioned on a more front side than the input shaft 42 of the pump 43; in the longitudinal direction, the axis p4 of the input shaft 42 of the pump 43 be positioned as close as possible to the axis p5 of the axle 3A; and in the vertical direction, the axis p4 of the input shaft 42 of the pump 43, the axis p6 of the output shaft 44a of the motor 44, the axis p5 of the axle 3A, and the axis p2 of the PTO shaft 27 be on the same horizontal plane or be positioned at nearly the same height. Other configurations are configured the same way as in the above-described embodiment.

Third Alternative Embodiment

Figure 10:
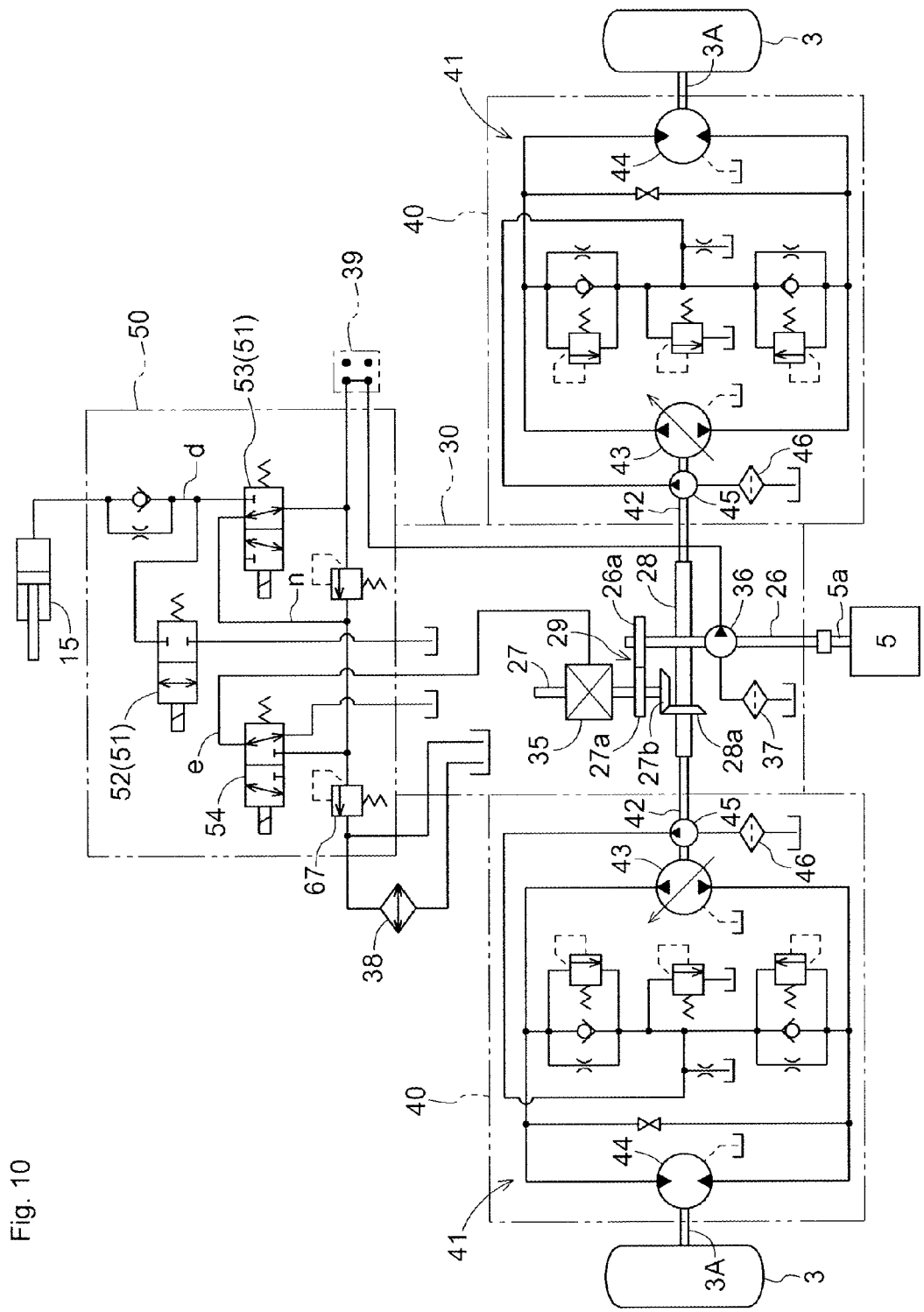
FIG. 10 is a hydraulic circuit diagram in another alternative embodiment.

In the above-described embodiment, it is described that, in the control valve unit 50, as illustrated in FIG. 7, the control valve 51 of the circuit d and the switching valve 54 of the circuit e are respectively mechanically linked to the lift operation lever 64 and the PTO clutch lever 65, the circuit d supplying hydraulic oil to the hydraulic cylinder 15 that operates the lift arm 14 for lifting the mower, and the circuit e supplying hydraulic oil to the PTO clutch 35. However, the present invention is not limited to this. For example, as illustrated in FIG. 10, the control valve 51 may be configured by a valve 52 for rising and a valve 53 for lowering that use electromagnetic solenoids, and the switching valve 54 may also be configured by a structure that uses an electromagnetic solenoid, and these may be electrically linked. In this case, operation positions of the lift operation lever 64 and operations positions of the PTO clutch lever 65, although not illustrated in the drawings, may be detected by using suitable limit switches and position detection sensors, and the electromagnetic solenoids of the control valve 51 and the switching valve 54 may be excitation-actuated by using a suitable controller. Other configurations may be configured the same way as in the above-described embodiment.

Fourth Alternative Embodiment

In the above-described embodiments, it is described that, in the control valve unit 50, as illustrated in FIG. 7, the control valve 51 of the circuit d and the switching valve 54 of the circuit e are respectively mechanically linked to the lift operation lever 64 and the PTO clutch lever 65, the circuit d supplying hydraulic oil to the hydraulic cylinder 15 that operates the lift arm 14 for lifting the mower, and the circuit e supplying hydraulic oil to the PTO clutch 35. Or, as illustrated in FIG. 10, the control valve 51 is configured by the valve 52 for rising and the valve 53 for lowering that use electromagnetic solenoids and the switching valve 54 is configured by a structure that uses an electromagnetic solenoid. However, the present invention is not limited to this. For example, of the control valve 51 and the switching valve 54, one may be mechanically linked to the lift operation lever 64 or the PTO clutch lever 65, and the other may be a valve of a structure that uses an electromagnetic solenoid and may be electrically linked. Other configurations may be configured the same way as in the above-described embodiment.

Fifth Alternative Embodiment

In the above-described embodiment, it is described that the hydraulic pump 36 for supplying or discharging the lubrication oil reservoired in the input case 30 and the hydraulic pump 45 that sucks in and pressurizes the reservoir oil reservoired in the axle cases 40 and discharges the reservoired oil as high pressure hydraulic oil are both configured with trochoid type capacity pumps that use internal gears. However, the present invention is not limited to this. For example, for one or both of the hydraulic pumps 36 or 45, a suitable pump may be adopted such as one configured with a biaxial gear pump. Other configurations may be configured the same way as in the above-described embodiment.

INDUSTRIAL APPLICABILITY

The work vehicle of the present invention is applicable to various work vehicles that are provided with a PTO shaft, such as a cultivator, a small tractor, a transporter vehicle, in addition to a mower.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle wherein
on left and right sides of an input case, axle cases are respectively positioned to drive at least one of left or right traveling wheels, the input case forming a first enclosed space into which an input shaft for engine power transmission is introduced, the axle cases forming second enclosed spaces which are separate from each other and from the first enclosed space in which hydraulic continuously variable transmissions are respectively internally installed and supporting axles of the left or right traveling wheels, and the left or right traveling wheels being driven via the hydraulic continuously variable transmissions,
a branch transmission shaft branch-transmitting a driving force of the input shaft to the hydraulic continuously variable transmissions in the axle cases is provided in the input case,
an input case oil pump supplying reservoir oil reservoired in the input case to devices located within the input case to be supplied with the reservoir oil and an input case filter for filtering the reservoir oil circulating in the input case are provided in the input case, and
first and second axle oil pumps supplying reservoir oil in each of the left and right axle cases to the hydraulic continuously variable transmission provided in each of the left and right axle cases and first and second axle case filters filtering the reservoir oil circulating in each of the axle cases are provided in each of the axle cases.

2. The work vehicle according to claim 1, wherein
the input case and the axle cases on the left and right sides have fitting portions formed on mutually opposing sides in a lateral direction and at places on outer periphery sides of the branch transmission shaft, the fitting portions being engageable and disengageable depending on a relative movement between the input case and the axle cases along an axial direction of the branch transmission shaft, and
in an engaged state of the fitting portions, the input case and the axle cases are linked in a state in which relative movements between the input case and the axle cases in vertical and longitudinal directions are regulated.

3. The work vehicle according to claim 2, wherein
in the input case, a PTO shaft is supported for taking out a driving force from the input case to outside and a PTO clutch is internally installed for intermittently transmitting a driving force transmitted from the input shaft to the PTO shaft.

4. The work vehicle according to claim 2, wherein
a lift arm lifting a working apparatus and a lifting cylinder for up and down swinging the lift arm are provided on a work vehicle body, and
a lifting valve controlling actuation of the lifting cylinder is provided in the input case and reservoir oil in the input case is supplied.

5. The work vehicle according to claim 1, wherein:
the first input case filter is arranged near a bottom of the input case and is replaceable by removal of a closing lid arranged on the input case;
the first axle case filter arranged near a bottom of the first axle case and is replaceable by removal of a first closing lid arranged on the first axle case; and the second axle case filter arranged near a bottom of the second axle case and is replaceable by removal of a second closing lid arranged on the second axle case.

6. A work vehicle wherein
on left and right sides of an input case, axle cases are respectively positioned to drive at least one of left or right traveling wheels, the input case forming a first enclosed space into which an input shaft for engine power transmission is introduced, the axle cases forming second enclosed spaces which are separate from the first enclosed space in which hydraulic continuously variable transmissions are respectively internally installed and supporting axles of the left or right traveling wheels, and the left or right traveling wheels being driven via the hydraulic continuously variable transmissions,
a branch transmission shaft transmitting a driving force of the input shaft to the hydraulic continuously variable transmissions in the axle cases is provided in the input case,
the input case and the axle cases on the left and right sides have fitting portions formed on mutually opposing sides in a lateral direction and at places on outer periphery sides of the branch transmission shaft, the fitting portions being engageable and disengageable,
the branch transmission shaft engaging with said supporting axles in areas of the fitting portions, and
in an engaged state of the fitting portions, the input case and the axle cases are linked.

7. The work vehicle according to claim 6, wherein an axis of the branch transmission shaft is aligned with axes of said supporting axles.

8. The work vehicle according to claim 6, wherein the input shaft drives a first hydraulic pump located within the input case and each said supporting axle drives a hydraulic pump located in each of the axle cases.

9. The work vehicle according to claim 8, wherein a center axis of the branch transmission shaft extends through each of the axle cases.

10. The work vehicle according to claim 8, wherein the first hydraulic pump is located above the branch transmission shaft.

11. The work vehicle according to claim 6, wherein a center axis of the branch transmission shaft extends through each of the axle cases.

12. The work vehicle according to claim 6, wherein:
the input case comprises a first oil filter arranged near a bottom of the axle case; and
the axle cases each comprising an oil filter arranged near a bottom thereof.

13. A work vehicle comprising:
an input case defining a first enclosed space and comprising an input shaft, a branch transmission shaft, a first pump pumping oil within the first enclosed space and a first filter filtering the oil located within the first enclosed space;
a right axle case defining a second enclosed space and comprising a right hydraulic continuously variable transmission, a second pump pumping oil within the second enclosed space, a second filter filtering the oil located within the second enclosed space, and a right axle shaft providing drive power to a right wheel;
a left axle case defining a third enclosed space and comprising a left hydraulic continuously variable transmission, a third pump pumping oil within the third enclosed space, a third filter filtering the oil located within the second enclosed space, and a left axle shaft providing drive power to a left wheel; and
the branch transmission shaft transmitting a driving force of the input shaft to the right and left hydraulic continuously variable transmissions via the right and left axle shafts.

14. The work vehicle according to claim 13, wherein an axis of the branch transmission shaft is aligned with axes of the right and left axle shafts.

15. The work vehicle according to claim 13, wherein a center axis of the branch transmission shaft extends through each of the left and right axle cases.

16. The work vehicle according to claim 13, wherein the first pump is located above the branch transmission shaft.

17. The work vehicle according to claim 13, wherein the right axle case further comprises a fitting portion that extends into and engages with a fitting receiving portion of the input case and wherein the right axle shaft engages with the branch transmission shaft within the input case.

18. The work vehicle according to claim 13, wherein the left axle case further comprises a fitting portion that extends into and engages with a fitting receiving portion of the input case and wherein the left axle shaft engages with the branch transmission shaft within the input case.

19. The work vehicle according to claim 13, wherein:
the right axle case further comprises a first fitting portion that extends into a first receiving portion of the input case and the right axle shaft engages with one end of the branch transmission shaft within the input case; and
the left axle case further comprises a second fitting portion that extends into a second receiving portion of the input case and the left axle shaft engages with another end of the branch transmission shaft within the input case.

20. The work vehicle according to claim 13, wherein:
the first filter is arranged near a bottom of the input case and is replaceable by removal of a first closing lid arranged on the input case;
the second filter arranged near a bottom of the right axle case and is replaceable by removal of a second closing lid arranged on the right axle case; and
the third filter arranged near a bottom of the left axle case and is replaceable by removal of a third closing lid arranged on the left axle case.

* * * * *